Nov. 22, 1955 C. A. CONSTANTINE 2,724,436

TAPE SPLICING MACHINE

Filed Jan. 18, 1954

INVENTOR
Charles A. Constantine
BY
Webster & Webster
ATTYS

United States Patent Office 2,724,436

Patented Nov. 22, 1955

2,724,436

TAPE SPLICING MACHINE

Charles A. Constantine, Stockton, Calif.

Application January 18, 1954, Serial No. 404,465

2 Claims. (Cl. 164—77)

This invention is directed to, and it is a major object to provide, an improved device for the purpose of splicing broken tape for sound recording machines; the tape being a thin, narrow, paper-like strip faced with a magnetic substance, which strip is easily broken, and which sometimes occurs either when the tape is being used for initial recording, or subsequently for sound reproduction in suitable apparatus.

Hence, there is need of a device which can be used for easily, quickly, and conveniently repairing the tape so that it can be continued in use; it being another important object of this invention to provide such a device, and which is relatively simple in structure and yet can be readily manipulated for the intended purpose.

An additional object of the instant invention is to provide a tape splicing device which includes a novel cutting unit which is operative to diagonally cut the broken end portions of the recording tape, and to maintain such cut ends in matching abutment for subsequent splicing together by a separate, relatively short length of splicing tape.

Still another object of the invention is to provide a tape splicing device, as in the preceding paragraph, wherein the cutting unit when actuated also functions to cut said relatively short length of the splicing tape; the splice being completed merely by manually picking up the cut, relatively short length of the slicing tape and superimposing it on the recording tape in spanning relation to the diagonally cut abutting ends thereof.

A further object of the invention is to provide a tape splicing device, as above, wherein the cutting unit includes a swinging arm movable between an initially upstanding tape clearance position and a horizontal lowered tape cutting position; there being a cutter manually slidable along the arm, when lowered, to make the cuts, both on the splicing tape and the recording tape. The swinging arm, which is adapted for spring-return to its upstanding tape clearance position, is releasably held—by a catch—against such return from said horizontal lowered tape cutting position; the catch being released, automatically, upon completion of a tape cuting stroke of the cutter, which is slidable along said arm from a predetermined starting position. The arm, upon release of the catch, thus automatically spring-returns to said upstanding tape clearance position, whereupon the cutter gravitationally slides back to its starting position on said arm. This enhances the facility of use of the device.

A still further object of the invention is to provide a tape splicing device which includes novel means arranged to maintain the recording tape and splicing tape in predetermined positions on the base for cutting; said tapes being disposed in a side by side, parallel relation, and the swing arm—when moved to its horizontal lowered tape cutting position—lying in intersecting relation to both tapes, whereby a single stroke of the cutter on said arm imparts a cut to both the recording tape and splicing tape.

It is also an object of the invention to provide a tape splicing device which is designed for ease and economy of manufacture.

Still another object of the invention is to provide a practical and reliable tape splicing device, and one which will be exceedingly effective for the purpose for which it is designed.

These objects are accomplished by means of such structure and relative arrangement of parts as will fully appear by a perusal of the following specification and claims.

Figure 1:
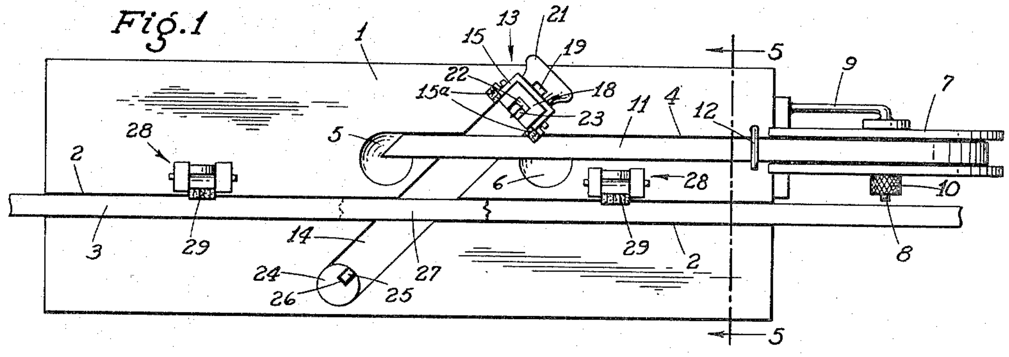
Fig. 1 is a plan view of the device; the swinging arm being shown in its upstanding tape clearance position, and the broken recording tape and the splicing tape being shown in position for the making of the cuts. In this view the recording tape hold-down clamps are in their raised or inoperative position.

Referring now more particularly to the drawings, and to the characters of reference marked thereon, the device comprises an elongated, rectangular base 1 which is formed—in the upper surface thereof—with a full length, shallow longitudinal groove 2 adapted for the reception of the recording tape 3.

Spaced to the rear of the groove 2, and parallel thereto, is another relatively shallow longitudinal groove 4; the latter extending from one end of the base 1, and communicating with a recess 5 formed in the base 1 intermediate its ends. The relatively shallow, longitudinal groove 4 also communicates, intermediate its ends, with another recess 6 spaced to the right of the recess 5.

At the end of the base 1 to which the relatively shallow longitudinal groove 4 extends, the device includes a transverse axis spool 7 carried on a lateral spindle 8 of an arm 9 fixed to the base 1 and extending at an upward outward incline therefrom; the spool 7 being removably secured on the spindle 9 by a finger nut 10.

The spool 7 carries a roll of splicing tape 11 dimensioned the same as the recording tape 3 but being of "Scotch" pressure-sensitive type; i. e., when a length of the tape 11 is placed lengthwise on the recording tape and a slight pressure applied, said tapes are adhered together. However, the splicing tape 11 is not normally sticky.

From the spool 7 the splicing tape 11 extends downwardly under a guide 12 on the base 1, and thence is disposed in the relatively shallow longitudinal groove 4 for the full length thereof, and with a slight projection in overhanging relation to the recess 5. Also, the splicing tape, as it lies in the longitudinal groove 4, spans over the recess 6.

The tape cutting unit of the device is indicated generally at 13 and comprises the following:

An elongated, diagonal cutter plate 14, of metal, is countersunk in the base 1 to the extent that the upper surface of said plate is flush with the bottom of the grooves 2 and 4; the plate 14 being of such length that it intersects, and extends at the ends beyond, the adjacent grooves.

When the recording tape 3 is disposed in the groove 2, and the splicing tape 11 is disposed in the groove 4, the diagonal cutter plate 14 underlies both of said tapes, as shown.

A swingable cutter guide arm 15, of channel shape in cross section, is spring-hinged, as at 16, to a pair of ears 17 at the rear end of the diagonal cutter plate 14; such cutter guide arm 15 normally upstanding in a tape clearance position under the influence of the spring hinge 16, and the channel of said arm then opening forwardly.

A slide 18 is disposed in the channel of the arm 15, and includes a guide web 19 which extends through a lengthwise slot 20 in said arm; the web 19 being connected to a knob 21 which runs on the outside of said arm 15.

The slide 18 is notched lengthwise, as at 22, and a cutter wheel 23 is journaled in, and projects out of, said notch so that when the arm 15 is in a horizontal lowered position, the cutter wheel 23 runs on the diagonal cutter plate 14 in tape-cutting relation.

Figure 2:
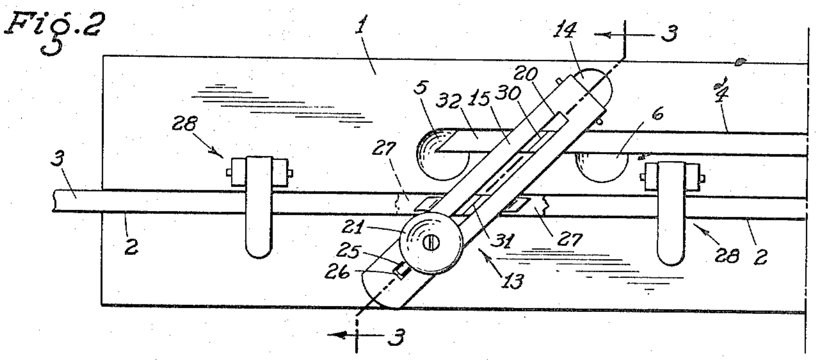
Fig. 2 is a fragmentary plan view similar to Fig. 1, but shows the swinging arm in its horizontal, lowered tape cutting position; the cutter being shown as advanced, and the tape hold-down clamps being illustrated in their operative position.

When the cutter guide arm 15 is manually swung from its upstanding tape clearance position, as in Fig. 1, to its horizontal lowered tape cutting position, as in Fig. 2, said arm is releasably maintained in such latter position by the following arrangement:

A small block 24 upstands from the base 1 at the forward end of the diagonal cutter plate 14, and such block serves as the mount for a pivoted, hook-type, rearwardly spring-pressed, catch 25. When the cutter guide arm 15 is in its lowered position the catch 25 projects through a hole 26 in said arm and releasably catch-engages with the then upper surface of the latter.

The above described tape splicing device is used in the following manner:

The recording tape 3 is first laid in the relatively shallow longitudinal groove 2, with the broken end portions lapped, as at 27, over the diagonal cutter plate 14; the recording tape being held in this position by hold-down clamps 28 mounted on the base 1 on opposite sides of, and spaced from, the diagonal cutter plate 14. The hold-down clamps 28 initially upstand, as in Fig. 1, but are manually swung down into a horizontal tape engaging position, as in Fig. 2; such clamps including a friction pad 29 which engages the recording tape 3 from above when the clamps are in their lowered or working position. The clamps 28 may be either frictionally or detent held in their respective positions.

The splicing tape 11 is disposed in the relatively shallow groove 4 for its full length, with the free end of such tape—which is diagonally cut by reason of the preceding tape splicing operation—in overhanging relation to the recess 5 (see Fig. 1).

With the two tapes disposed in the groove, as above described, the cutter guide arm 15 is swung from its upstanding tape clearance position, as in Fig. 1, downwardly to its horizontal lowered tape cutting position, as in Fig. 2; the catch 25 then engaging the arm and releasably holding it in said lowered position. In such lowered position of the cutter guide arm 15 small pads **15*a* on opposite sides of said arm engage the broken lapped ends 27 of the recording tape 3** to assure that such ends are held against any relative displacement.

Nextly, the knob 21 is grasped and is manually pulled through a full forward stroke, which causes the cutter wheel 23, working against the cutter plate 14, to diagonally cut the splicing tape 11, as at 30, and to then diagonally cut the lapping broken ends 27 of the recording tape 3, as at 31. At the end of this stroke the knob 21 engages and releases the catch 25, whereupon the cutter guide arm 15 spring-returns to its initial upstanding position, and the knob 21, together with the slide 18 which carries the cutter 23, return gravitationally to starting position; i. e., in the end of the arm 15 near the spring hinge 16.

As a result of the cuts made by the full forward stroke of the cutter wheel 23, a relatively short length 32 of the splicing tape is severed from the free end portion thereof, and additionally the cut 31 severs the broken end portions of the recording tape 3; the uppermost one of said severed end portions being easily brushed aside, and the lowermost one remaining in place until the operation is complete.

Figures 3, 4, 5, 6:
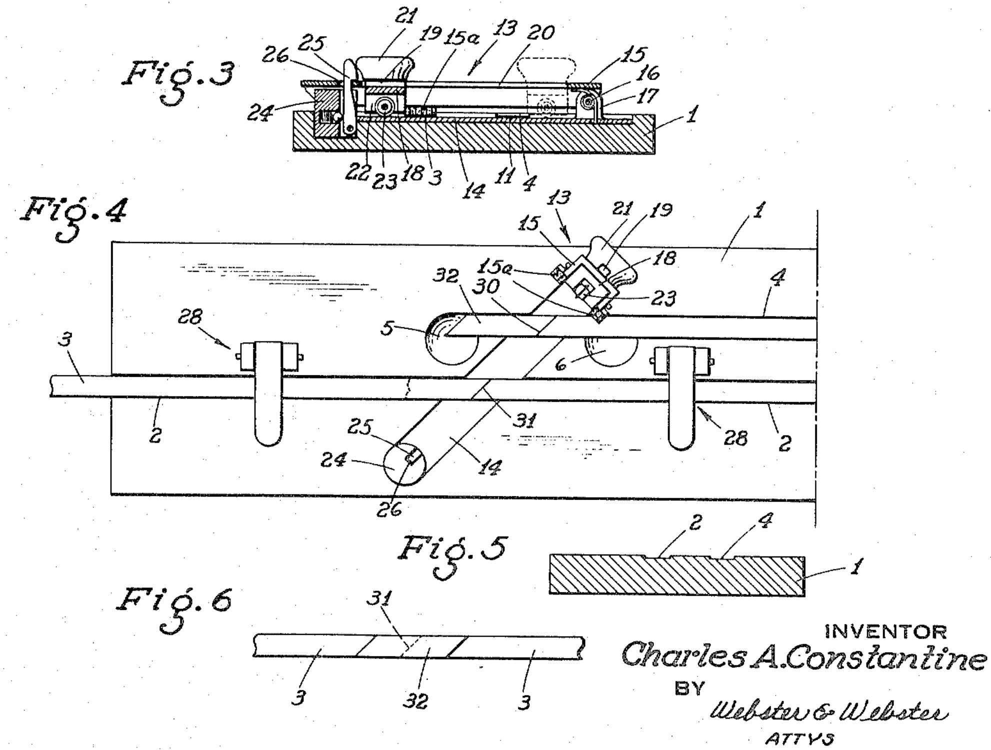
Fig. 3 is a transverse section on line 3—3 of Fig. 2.
Fig. 4 is a view similar to Fig. 2, but shows the swinging arm as returned to its upstanding tape clearance position after the cutting of the tapes.
Fig. 5 is a transverse section on line 5—5 of Fig. 1 showing the shallow longitudinal grooves in the base; the tapes being omitted from such grooves.
Fig. 6 is a fragmentary plan view showing the recording tape splice as completed.

The relatively short length 32 of the splicing tape is then picked up, preferably by tweezers; the recess 5 making this operation easy. After the short length 32 of splicing tape is picked up it is deposited on the recording tape 3 in longitudinal alinement and in lapping relation to the diagonal cut 31. See Fig. 5. As so disposed, slight finger pressure is applied to the short length 32 of splicing tape, which—by reason of its type—adheres to the recording tape, producing an effective connection or splice. Thereafter, the hold-down clamps 28 are swung upward to released position, and the repaired recording tape 3 is removed from the groove 2.

To prepare the device for a subsequent tape splicing operation it is only necessary to advance the splicing tape 11 in the groove 4 until another short length thereof extends across the diagonal cutter plate 14 and projects to a free end termination above the recess 5. This advancing of the splicing tape 11 is accomplished readily, as a pair of tweezers can be used to grasp such tape ahead of the plate 14, and which grasping is facilitated by the recess 6. When the splicing tape 11 is grasped at the recess 6 it is merely pulled forward the desired distance; the tape running off of the spool 7 in a corresponding amount. As so pulled forward the splicing tape 11 is redeposited in the groove 4, as shown in Fig. 1.

The purpose of making the cut 21, as well as both cuts at the ends of the short length 32 of splicing tape, diagonal, is so that there is no substantial audible disturbance when the splice runs through the sound reproducing apparatus in which the tape is being used.

With the described invention broken recording tape can be repaired quickly and with facility, yet with the structure of the device remaining very simple and easy to operate.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A recording tape splicer comprising a base, locator means on the base adapted to maintain a recording tape thereon with the broken ends longitudinally alined and lapped, and a tape cutting unit on the base operative to impart a transverse cut through said lapped ends of the tape; said tape cutting unit including a cutter guide arm pivoted on the base for swinging between an initially upstanding tape clearance position and a lowered tape cutting position adjacent and intersecting said lapped ends, and a tape cutter slidable on said arm from a predetermined starting position and in a direction transversely of said lapped ends; a catch mounted on the base operative to releasably secure the free end of the arm in said lowered position, and an element mounted on the slidable cutter positioned to engage and release the catch upon completion of a tape cutting stroke of the cutter along the arm.

2. A splicer as in claim 1, in which the catch is a hook-type spring pressed element upstanding from the base and opening toward the arm, the latter having an opening through which the catch element projects; the catch being adapted to engage the wall of the opening nearest the pivoted end of the arm and then projecting above the arm and the opening being of sufficient extent to allow of releasing movement of the catch element, away from said wall; the catch releasing element being an actuating knob connected to the cutter and upstanding from the arm in position to engage said upwardly projecting portion of the catch element.

References Cited in the file of this patent

UNITED STATES PATENTS

| | | |
|---|---|---|
| 840,702 | Maloney | Jan. 8, 1907 |
| 1,306,261 | Klein | June 10, 1919 |
| 2,103,217 | Ford | Dec. 21, 1937 |
| 2,117,153 | Diamond | May 10, 1938 |
| 2,539,611 | Daniel et al. | Jan. 30, 1951 |
| 2,552,148 | Carson | May 8, 1951 |
| 2,599,667 | Tall | June 10, 1952 |
| 2,668,576 | Nichols | Feb. 9, 1954 |